US006969082B2

(12) United States Patent
Griffin et al.

(10) Patent No.: US 6,969,082 B2
(45) Date of Patent: Nov. 29, 2005

(54) UNIVERSAL MOTORCYCLE FRAME SLIDE PROTECTOR

(75) Inventors: Matthew Griffin, Palm Harbor, FL (US); Daniel Geberth, New Port Richey, FL (US)

(73) Assignee: Performance Industries Manufacturing, Inc., Odessa, FL (US)

( * ) Notice: Subject to any disclaimer, the term of this patent is extended or adjusted under 35 U.S.C. 154(b) by 0 days.

(21) Appl. No.: 10/751,779

(22) Filed: Jan. 5, 2004

(65) Prior Publication Data

US 2005/0146114 A1    Jul. 7, 2005

(51) Int. Cl.[7] .............................................. B62J 27/00
(52) U.S. Cl. .................................. 280/291; 280/304.3
(58) Field of Search ............................ 280/288.4, 291, 280/293, 298, 304.3, 755, 848; 180/232; D12/167; 293/105, 142

(56) References Cited

U.S. PATENT DOCUMENTS

| 615,533 A | | 12/1898 | Demory ..................... 280/291 |
| 625,368 A | * | 5/1899 | Thompson ................. 280/291 |
| 3,075,789 A | * | 1/1963 | Ion Von ..................... 280/295 |
| 3,484,829 A | * | 12/1969 | Erickson ..................... 280/291 |
| 3,967,834 A | * | 7/1976 | La Charite .................. 280/291 |
| 4,458,910 A | * | 7/1984 | Stillwagon .................. 280/291 |
| 5,106,136 A | | 4/1992 | Crain ......................... 293/105 |
| 5,476,162 A | * | 12/1995 | Reed et al. ................. 188/344 |
| 5,524,918 A | * | 6/1996 | Peabody et al. ............ 280/291 |
| 5,884,983 A | * | 3/1999 | Wu ......................... 301/124.1 |
| 6,161,859 A | * | 12/2000 | Cheng ........................ 280/291 |
| 6,193,255 B1 | * | 2/2001 | Lo ............................. 280/291 |
| 6,485,044 B1 | * | 11/2002 | Blake ....................... 280/288.4 |
| 6,499,378 B1 | * | 12/2002 | Ho ............................... 74/564 |
| 2003/0222425 A1 | * | 12/2003 | Dennert et al. ............. 280/291 |

FOREIGN PATENT DOCUMENTS

| EP | 1391373 A1 * | 2/2004 | ............ B62J 27/00 |
| JP | 2002356189 A * | 12/2002 | ............ B62J 27/00 |

* cited by examiner

*Primary Examiner*—Lesley D. Morris
*Assistant Examiner*—Daniel Yeagley
(74) *Attorney, Agent, or Firm*—Larson & Larson, PA; Herbert W. Larson

(57) ABSTRACT

The device includes an aluminum base member, a durable plastic puck and a stainless steel bolt, each of the foregoing having a hollow channel through the center. The base member is mounted to the motorcycle frame. Using the hollow bolt, the puck member is mounted to the exposed end of the base member. By removing the hollow bolt, the puck member can be replaced easily.

14 Claims, 6 Drawing Sheets

UNIVERSAL MOTORCYCLE FRAME SLIDE PROTECTOR

BACKGROUND OF THE INVENTION

1. Field of the Invention

The present invention relates to device attached to the frame of a motorcycle that prevents the body of the motorcycle from being scratched in the event that the motorcycle slides across the ground or falls. More particularly, it relates to a universal device having an aluminum base member and a removable and replaceable hard plastic scrape protector known as a puck attached thereto.

2. Description of the Prior Art

Motorcycles are very popular of late and have become much more than just a mode of transportation for many people. Restoration of older models and stylized modifications of new models have become a hobby for many and it is not unheard of for individuals to spend thousands of dollars on paint jobs for these specialty motorcycles. A device is needed to protect the frame of the motorcycle in the event the cycle slides across the ground or falls over, yet it must be small and lightweight so as not to disrupt the balance of the motorcycle.

Several devices are known in the prior art to perform protection type functions for motorcycles. U.S. Pat. No. 5,106,136 describes a motorcycle bumper system designed to protect the rider's legs in the event of a crash. This bumper system is made up of at least one round bumper on each side of the motorcycle. The bumpers are large and obtrusive and the plastic bumper material is not easily replaced if scratched.

Other frame protector sliders are known in the prior art but are not designed to be used on either side of the bike. In addition, these frame sliders are constructed from one piece and do not employ easily removable pucks to allow for replacement if the existing pucks are damaged in a crash or fall. What is needed is a frame slide protector that can be used on both the left and right side of the bike (i.e., universal) having an easily removable puck so that it can be replaced without the need to remove the entire frame slider device.

SUMMARY OF THE INVENTION

We have invented such a universal frame slide protector device for use on either side of a motorcycle. The device is small and lightweight and will not interfere with the delicate balance of the bike or the positioning of the rider's legs. The device includes an aluminum base member mounted to the frame of a motorcycle and a plastic puck mounted upon the base member that can be quickly removed and easily replaced without removing the entire protector device. The aluminum base member can be manufactured in several shapes of varying weights.

Our device includes the aluminum base member and the plastic scrape protector member (or puck). The base member has a shaft which inserts into an opening located in the body of a motorcycle. A bolt is inserted through the base member to mount the base member to an existing bolt hole in the motorcycle frame. A cylindrically shaped, durable plastic scrape protector, called a puck, fits flush against the exposed outer face of the base member. A custom manufactured, hollowed-out bolt inserts through the puck and engages a ridge portion of an the inner surface of the base member. This bolt can be easily removed to allow for the puck member to be replaced without removing the entire device from the frame of the motorcycle. The bolt shoulder portion presses against the ridge within the puck to assist in securing the puck to the base member.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
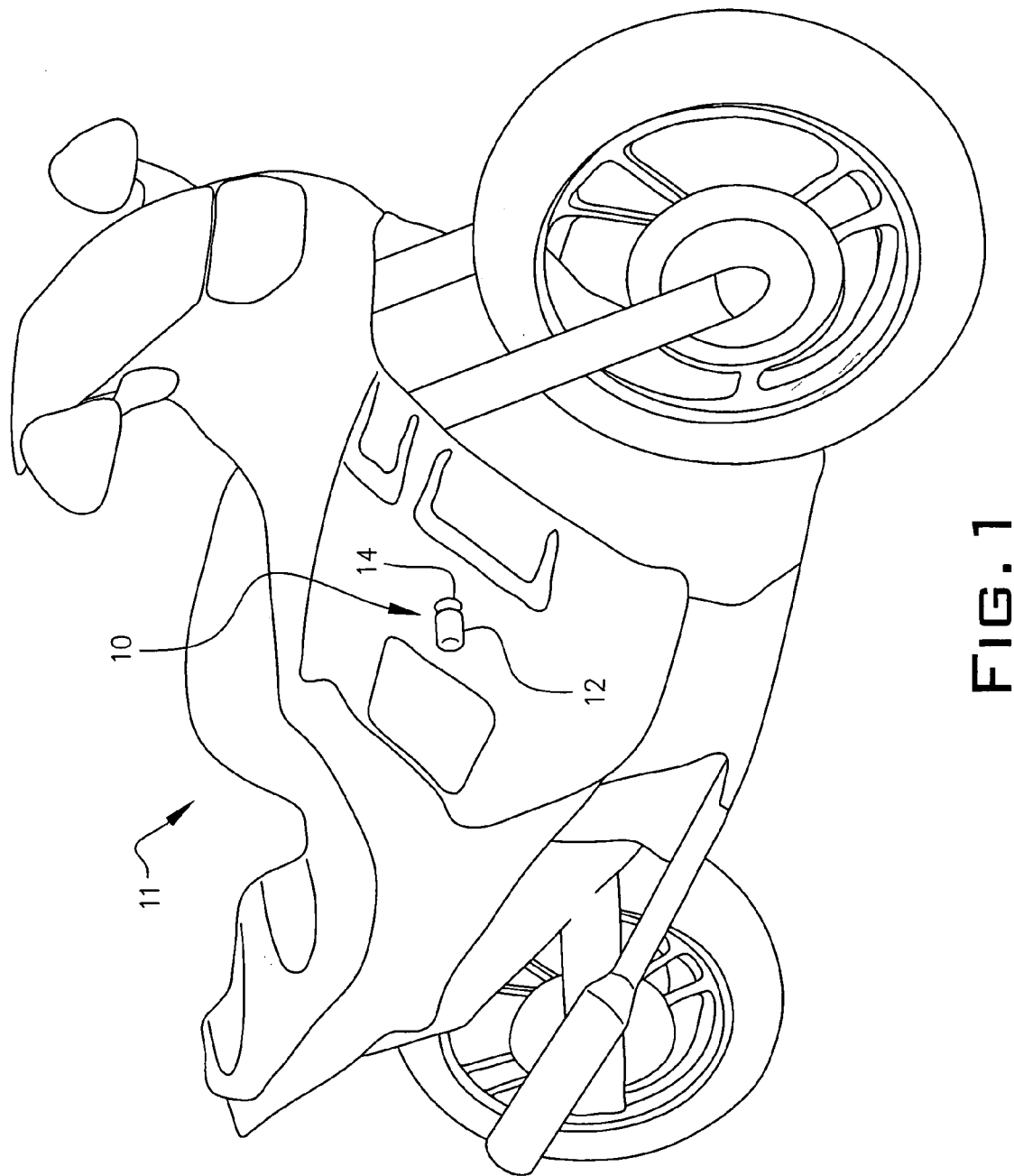
FIG. 1 is a perspective view of a universal motorcycle frame slider protector of the present invention attached to a aide section of a motorcycle.
Figure 2:
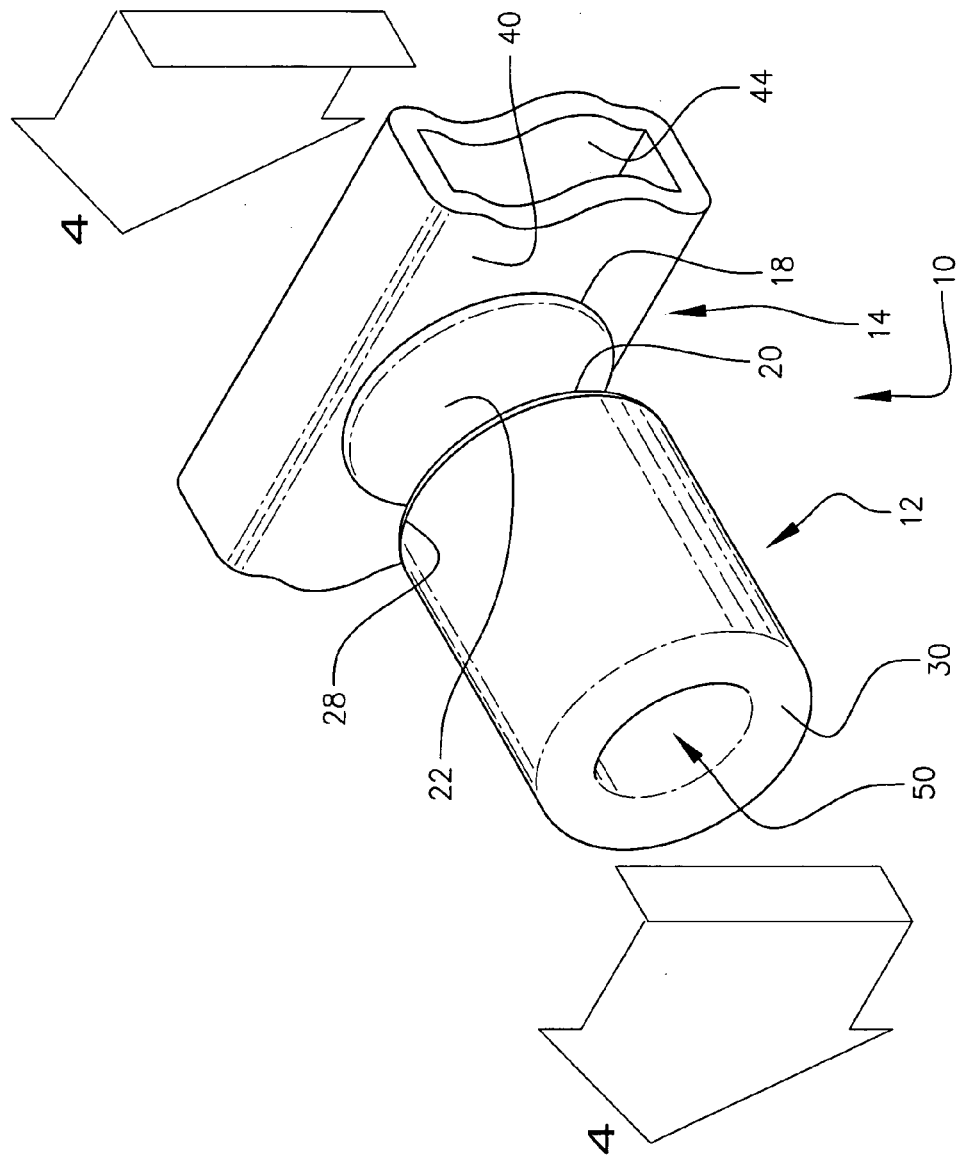
FIG. 2 is a perspective view of the frame slider protector device attached to a side rail of a motorcycle.

Throughout the following detailed description, the same reference numerals refer to the same elements in all figures.

Figure 3:
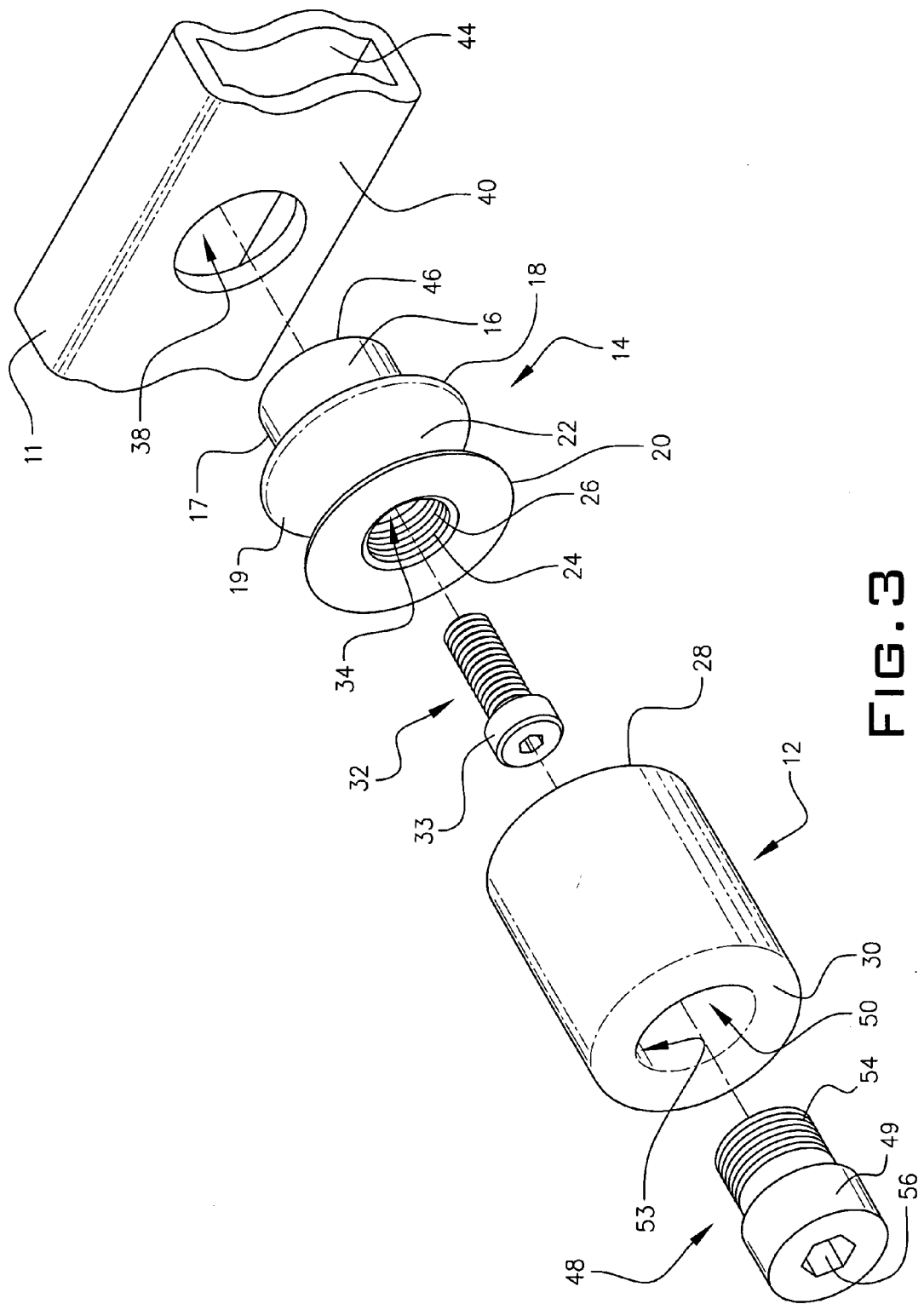
FIG. 3 is an exploded view of a preferred frame slider protector device of the present invention.

Referring to FIG. 3, a motorcycle frame slide protector device 10 of the present invention is shown having a hollow cylindrical base member 14 with a proximal portion 17 and a distal portion 19. The proximal portion 17 contains an outwardly protruding cylindrical shaft 16. The distal portion 19 has a first lip 18 and second lip 20 forming a concave shaped groove 22 positioned there between. Threads 24 are positioned along an inner circumference 26 of a channel 34 of base member 14 at distal portion 19. A puck member 12 includes a hollow cylindrical tube having a flattened proximal end 28 and a rounded distal end 30.

Figure 4:
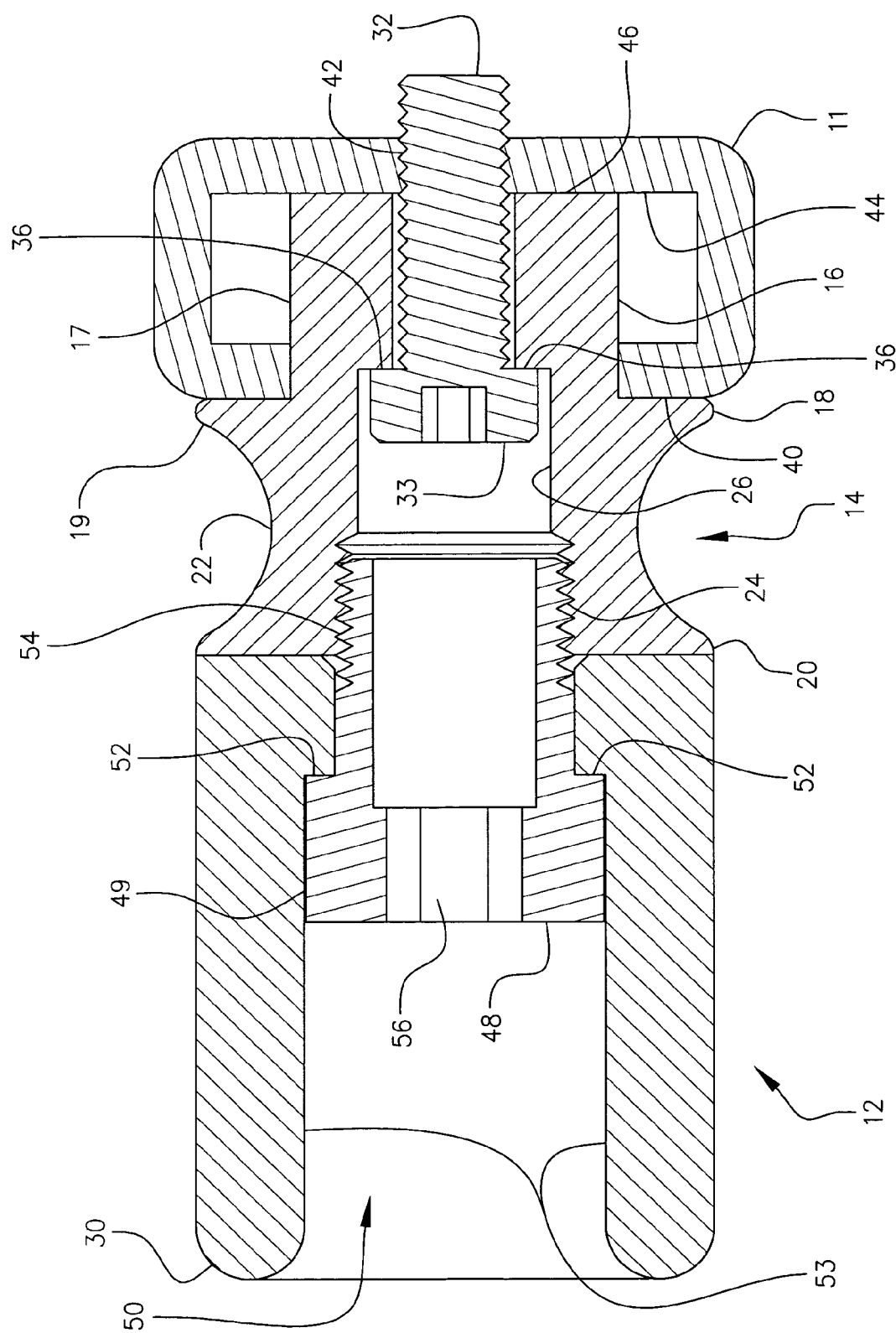
FIG. 4 is a cross-sectional view of the preferred frame slider protector of the present invention along lines 4—4 of FIG. 2.

Referring to FIG. 4, base member 14 is attached to a motorcycle 11 by a first threaded bolt 32 inserted through channel 34 of base member 14. A head portion 33 of first bolt 32 rests up against a shoulder portion 36 inside of base member 14 along its inner circumference to assist in holding base member 14 in place to motorcycle 11. An opening 38 (see FIG. 3) formed in a motorcycle body 40 reveals an existing bolt hole 42 in a motorcycle frame 44. The protruding shaft 16 extends through opening 38 and into motorcycle body 40. First bolt 32 is inserted into frame bolt hole 42. Threads on first bolt 32 engage reciprocal threads inside frame bolt hole 42. A flat end 46 of shaft 16 is positioned juxtaposed with motorcycle frame 44 while first lip 18 rests against motorcycle body 40.

With continuing reference to FIG. 4, puck member 12 attaches to base member 14 by inserting a hollow second threaded bolt 48 into channel 50 of puck member 12. Channel 50 of puck member 12 is axially aligned with channel 34 of base member 14. A head portion 49 of second bolt 48 rests against a shoulder 52 along an inner circumference 53 of the puck member 12. A threaded end 54 of second bolt 48 protrudes through proximal end 28 of puck member 12. Threaded end 54 of second bolt 48 is inserted into channel 34 of base member 14 and engages threads 24 therein. A polygonal outlet 56 allows second bolt 48 to be easily tightened and loosened with an appropriate reciprocal tool (not shown), for instance, an Allen Key Wrench. Flattened surface 28 of puck 12 rests flush against second lip 20 of the base member 14.

Figure 5:
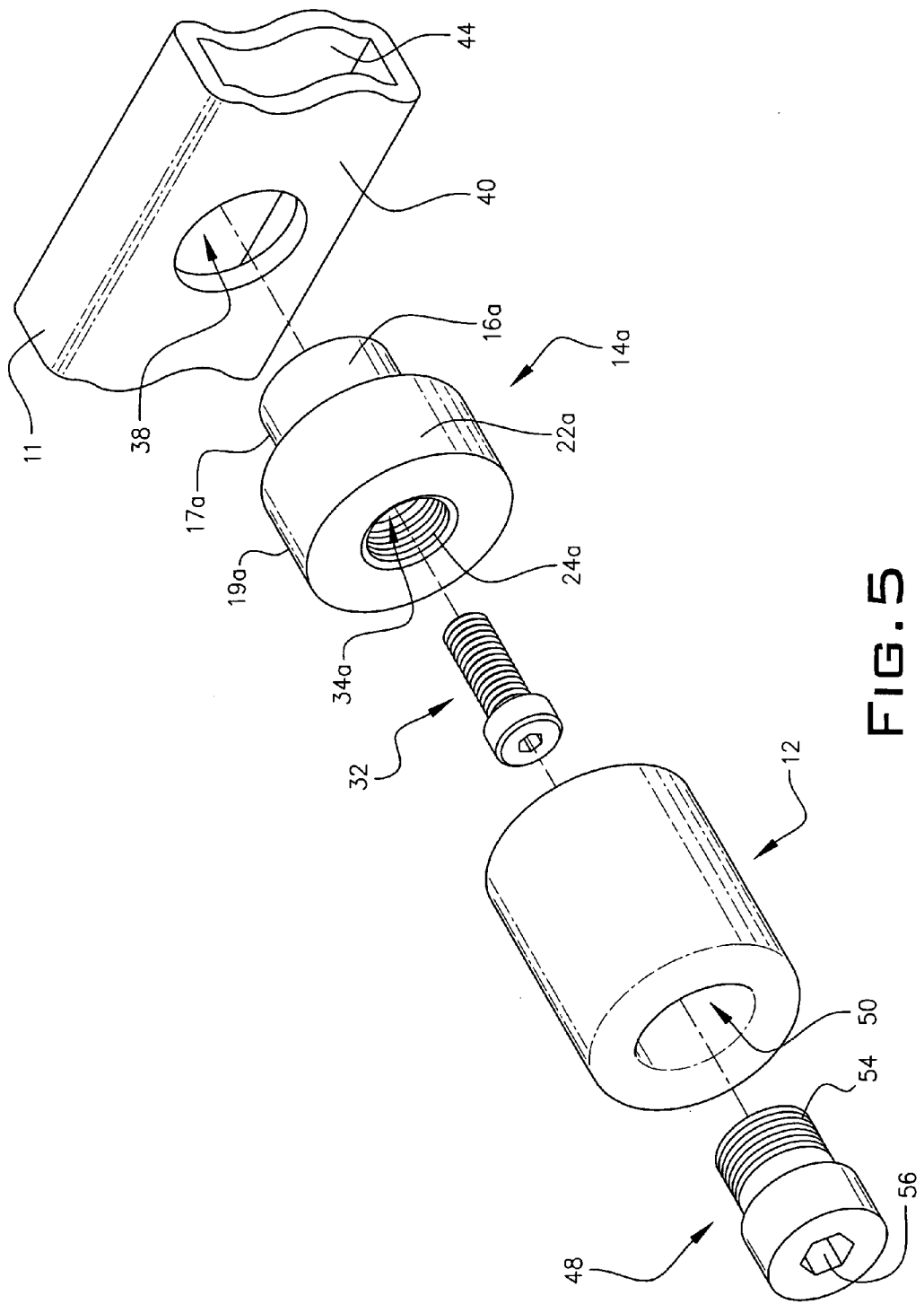
FIG. 5 is an exploded view of a first alternate embodiment of a frame slider protector device of the present invention.
Figure 6:
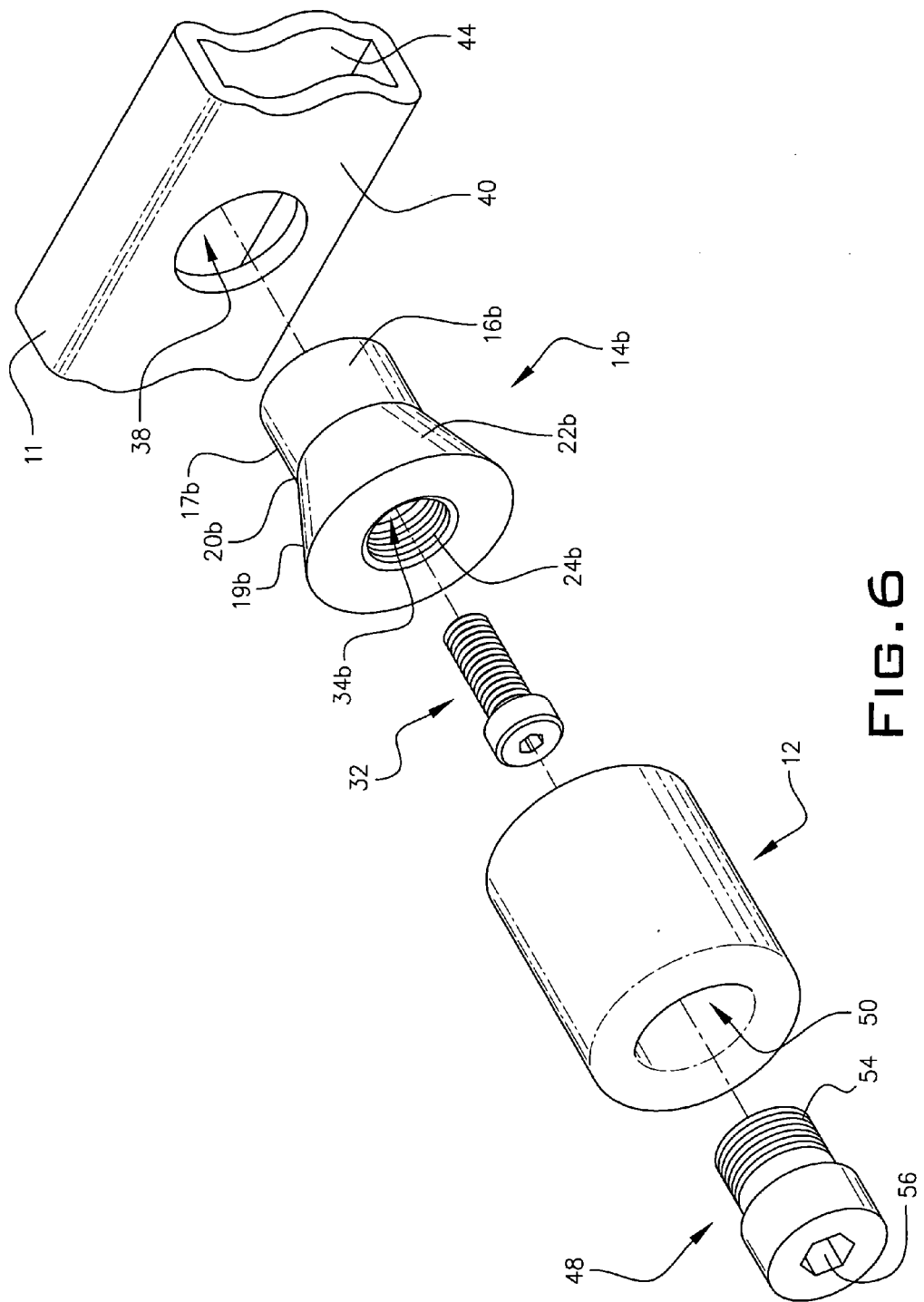
FIG. 6 is an exploded view of a second alternate embodiment of a frame slider protector device of the present invention.

Outwardly protruding shaft 16 of base member 14 can be of varying circumferences and lengths to accommodate a plurality of different motorcycle styles. As shown in FIGS. 5 and 6, the exposed portion of base member can be different shapes in order to vary the net weight of the entire device.

Referring to FIG. 5, a first alternate embodiment has a base member 14a with an outwardly protruding shaft 16a at a proximal portion 17a. A distal portion 19a has a solid cylindrical shape 22a. When attached to a motorcycle side rail 11, protruding shaft 16a extends through the opening 38 in motorcycle body 40 such that cylindrical distal portion 19a rests against motorcycle body 40a. Second bolt 48 inserts through puck member 12 and engages threads 24a on an inner circumference of channel 34a of base member 14a.

Referring to FIG. 6, a second alternate embodiment has a base member 14b with an outwardly protruding shaft 16b at a proximal portion 17b. A distal portion 19b flares outwards from a center portion 20b thereby forming a conical distal portion 22b. When attached to a motorcycle side rail 11, proximal shaft 16b extends through opening 38 and into motorcycle body 40. Second bolt 48 inserts through puck member 12 and engages threads 24b on an inner circumference of channel 34b of base member 14b.

The device shown in FIGS. 2–6 is attached to a motorcycle side rail 11. However, nothing herein limits the novel device of the present invention from being attached to the body, frame, or other attachable structure of any motorcycle or other motorized two, three or four wheeled vehicle which may benefit from being protected with such a device.

Equivalent elements can be substituted for the ones set forth above such that they perform the same function in the same way for achieving the same result.

What is claimed is:

1. A universal slide frame protector device for use on a motorcycle, the protector device comprising:
    a) an aluminum base member having a center channel formed through a middle portion thereof and an outwardly extending shaft portion positioned at a proximal end of the base member, the outwardly extending shaft portion having a center axis in axial alignment with the base member center channel, the base member attaching to the motorcycle by a first bolt inserting through the base member center channel and the outwardly extending shaft portion center axis and into a bolt hole formed on the motorcycle, the base member outwardly extending shaft portion being received by an opening formed in the motorcycle around the bolt hole,
    b) a cylindrical puck member having a channel formed through a center axis, the puck member channel in axial alignment with the base member center channel and shaft portion center axis, and
    c) a second hollow bolt having a threaded end and a cylindrical head portion forming a lip for removably securing the puck member to the bass member.

2. The universal slide protector device of claim 1, further comprising the base member having a first lip located at a center portion thereof and a second lip at a distal end forming a middle portion there between.

3. The universal slide protector device of claim 2, wherein the base member middle portion is concave shaped.

4. The universal slide protector device of claim 2, wherein the base member middle portion is cylindrically shaped.

5. The universal slide protector device of claim 2, wherein the base member middle portion is conical in shaped.

6. The universal slide protector device of claim 1, wherein an inner circumference of the base member channel is threaded at its distal end for receiving the threaded end of the second hollow bolt.

7. The universal slide protector device of claim 1, wherein a shoulder is formed along an inner circumference of the base member near a proximal end for narrowing the inner circumference of the base member channel from the shoulder to the proximal end.

8. The universal slide protector device of claim 1, wherein the puck member has a flat proximal end and a rounded distal end.

9. The universal slide protector device of claim 1, wherein the puck member has a shoulder formed along an inner circumference of the channel near the puck member proximal end for narrowing the circumference of the puck member channel from the shoulder to its proximal end.

10. The universal slide protector device of claim 1, wherein the head portion of the second hollow bolt has a polygonal shaped opening.

11. A universal slide frame protector device for use on a motorcycle, the protector device comprising:
    a) an aluminum base member having a first lip located at a center portion thereof and a second lip located at a distal end thereof forming a middle portion there between, a center channel formed through the base member and having a threaded portion, an outwardly extending shaft portion positioned at a proximal end of the base member, the outwardly extending shaft portion having a center axis in axial alignment with the base member center channel, the base member attaching to the motorcycle by a first bolt inserting through the base member center channel and the outwardly extending shaft portion center axis and into a bolt hole formed on the motorcycle, the base member outwardly extending shaft portion being received by an opening formed in the motorcycle around the bolt hole,
    b) a cylindrical puck member having a channel formed through a center axis and a shoulder portion formed along an inner circumference of the channel, the puck member channel in axial alignment with the base member center channel and the shaft portion center axis, and
    c) a second hollow bolt having a threaded end and a cylindrical head portion forming a lip for securing the puck member to the bass member by the second bolt head portion lip resting upon the puck member shoulder portion and the threaded end engaging the base member center channel threaded portion.

12. The universal slide protector device of claim 2, wherein the base member middle portion is concave shaped.

13. The universal slide protector device of claim 2, wherein the base member middle portion is cylindrically shaped.

14. The universal slide protector device of claim 2, wherein the base member middle portion is conical in shaped.

* * * * *